United States Patent [19]

Yamahata

[11] Patent Number: 5,151,993
[45] Date of Patent: Sep. 29, 1992

[54] DATA PROCESSOR PERFORMING OPERATION ON DATA HAVING LENGTH SHORTER THAN ONE-WORD LENGTH

[75] Inventor: Hitoshi Yamahata, Tokyo, Japan

[73] Assignee: NEC Corporation, Tokyo, Japan

[21] Appl. No.: 321,399

[22] Filed: Mar. 10, 1989

[30] Foreign Application Priority Data

Mar. 10, 1988 [JP] Japan .................................. 63-56808

[51] Int. Cl.$^5$ .............................................. G06F 9/30
[52] U.S. Cl. .................. 395/775; 364/262.81;
364/951.5; 364/DIG. 1
[58] Field of Search ................... 364/200, 262.81, 900,
364/951.5

[56] References Cited

U.S. PATENT DOCUMENTS

| | | | |
|---|---|---|---|
| 4,258,419 | 3/1981 | Blahut et al. ........................ | 364/200 |
| 4,272,828 | 6/1981 | Negi et al. ........................... | 364/900 |
| 4,307,445 | 12/1981 | Tredennick et al. ............... | 364/200 |
| 4,488,224 | 12/1984 | Ippolito et al. .................... | 364/200 |
| 4,586,130 | 4/1986 | Butts, Jr. et al. ................... | 364/200 |
| 4,593,267 | 6/1986 | Kuroda et al. ..................... | 364/900 X |
| 4,785,393 | 11/1988 | Chu et al. ........................... | 364/200 |
| 4,825,355 | 4/1989 | Kurakazu et al. .................. | 364/200 |
| 4,893,235 | 1/1990 | Butts, Jr. et al. ................... | 364/200 |

Primary Examiner—Michael R. Fleming
Assistant Examiner—Glenn A. Auve
Attorney, Agent, or Firm—Foley and Lardner

[57] ABSTRACT

A data processor for executing an instruction designating a half-word length operation or a quarter-word length operation in addition to one-word length operation is disclosed. This processor includes an operation unit performing an operation on data applied thereto and producing result data, a blocking register temporarily storing more significant bits data of a destination register, a first output circuit outputting less significant bits data of the result data when the half-word length operation or the quarter-word length operation is designated, and a second output circuit operatively outputting the data of the blocking register. The ouputs of the first and second circuits are then combined and written into the destination area.

10 Claims, 5 Drawing Sheets

DATA PROCESSOR PERFORMING OPERATION ON DATA HAVING LENGTH SHORTER THAN ONE-WORD LENGTH

BACKGROUND OF THE INVENTION

The present invention relates to a data processor and, more particularly, to a processor performing an operation on data having a short data length.

A data processor is often required to process data which includes a smaller number of bits than the usual processing words. For example, in a 32-bit processor in which one word consists of 32 bits, it is also required to process data of 16-bit length (i.e., half-word length) or 8-bit length (i.e., quarter-word or one-byte length) in addition to processing data of usual 32-bit word. The information for designating the length of data to be processed is contained in an instruction to be executed. It should be noted, however, that in order to simplify a hardware, the data processor executes an operation in word unit and performs data read/write operation in a word unit. That is, it is impossible to execute an operation only on the data of the designated length and to perform an write operation only of the resultant data into a destination register. On the other hand, the instruction designating an operation on the data of half-word or quarter-word length requests that the operation result is written into the corresponding portion of the destination register with the remaining portion thereof holding previous data.

For this purpose, a data processor according to the prior art includes a blocking register on the output side of an operation unit. When it is designated to process data of half-word or quarter-word length, the blocking register is controlled to temporarily store in its one portion the operation result corresponding to the designated data length and in the remaining portion the data of the corresponding portion of the destination register. In the case of designating an operation which processes data of one-word length, the blocking register is controlled to store data of full bits of the operation result. The data stored in the blocking register is thereafter transferred onto a data bus and written into the destination register. As a result, the instruction designating an operation on the data of half-word or quarter-word length as well as one-word length is executed.

However, the blocking register is provided on the output side of the operation unit to store full or partial bits of the operation result data. For this reason, if a plurality of operation units such as an arithmetic and logic unit, a multiplier, a shifter and the like are required, the number of the blocking registers is increased accordingly. Moreover, the operation result data is temporarily stored in the blocking register and thereafter transferred onto the data bus, so that an operation speed is lowered.

SUMMARY OF THE INVENTION

Therefore, an object of the present invention is to provide an improved data processor which can perform an operation on only one portion of data of processing one-word length.

Another object of the present invention is to provide a data processor which does not require a plurality of blocking registers even in the case where a plurality of operation units are provided.

Still another object of the present invention is to provide a data processor performing an operation on data of a length shorter than one-word length at a high speed.

A data processor according to the present invention comprises an operation unit performing an operation on data of one-word length applied thereto, a blocking register temporarily storing data of a destination area, a data bus, a first output buffer circuit coupled between the operation unit and the data bus and responding to information for designating a data length to be processed to transfer operation result data corresponding to the designated data length onto the data bus, and a second output buffer circuit coupled between the blocking register and the data bus and responding to the information to transfer the data in the blocking register not corresponding to the designated data length onto the data bus, the data on the data bus being written into the destination area.

The present invention is thus characterized in that the selected portion of the operation result data derived from the operation unit is transferred onto the data bus in accordance with the designated data length and, on the other hand, the blocking register temporarily stores the previous data of the destination area and does not store the operation result data, a part of the data stored in the blocking register being transferred onto the data bus. Accordingly, only one blocking register can be used for a plurality of operation units, so that the hardware construction can be simplified. Moreover, no register is required for temporarily storing the operation result data, and hence an operation can be performed at a high speed.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE EMBODIMENTS

Figure 1:
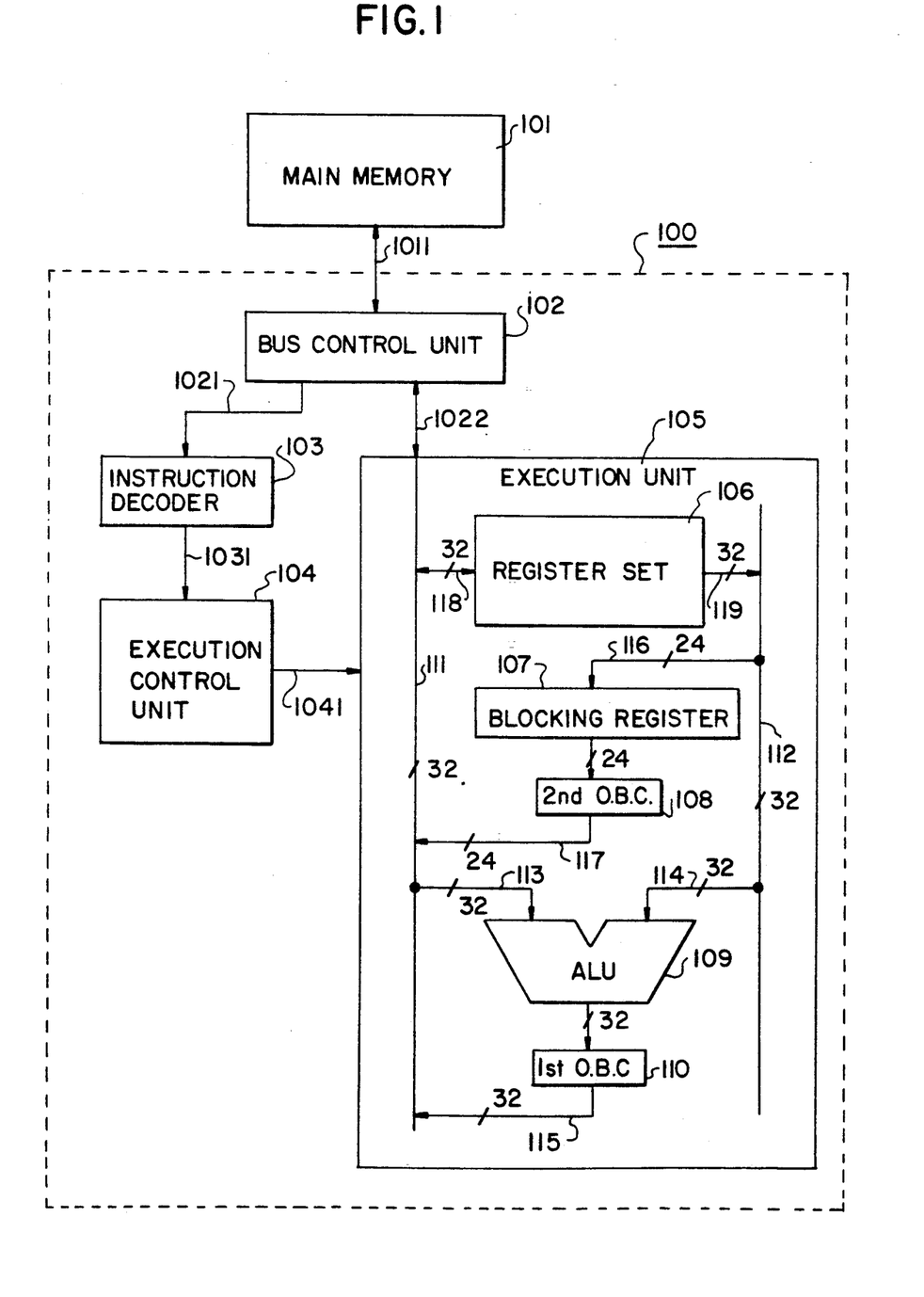
FIG. 1 is a block diagram representative of an embodiment of the present invention.

Referring to FIG. 1, a data processor 100 according to an embodiment of the present invention includes a bus control unit 102, an instruction decoder 103, an execution control unit 104 and an execution unit 105. The bus control unit 102 controls a system bus 1011 to fetch an instruction from a main memory 101 or to write and read data into and from the memory 101. The unit 102 further controls an internal bus 1022 to transfer data from the memory 101 to the execution unit 105, and vice versa. The instruction fetched by the unit 102 is supplied via an instruction bus 1021 to the instruction decoder 103. The decoder 103 decodes the instruction and supplies a decoded output 1031 to the execution control unit 104. In response to the decoded output 1031, the unit 104 produces various control signals at 1041 and supplies them to the execution unit 105. The control signals at 1041 include information for designating the length of data to be processed.

In the present embodiment, the data processor 100 is a 32-bit processor in which one word consists of 32 bits and which can perform an operation on data of one-word (32-bit) length, half-word (16-bit) length and quarter-word (8-bit) length. The execution unit 105 includes a 32-bit main-data-bus 111 coupled to the internal bus 1022. In order to enhance operation speed, the execution unit 105 further includes a 32-bit sub-data-bus 112. The main-data-bus 111 is further coupled to a set of registers 106 via a 32-bit bidirectional bus 118 to receive data from a selected register in the register set 106 or to transfer data thereon to a selected register. The register set 106 is further connected to the sub-data-bus 112 via a 32-bit unidirectional bus 119 to supply data of a selected register onto the bus 112. In a dyadic operation, source data is read onto the main-bus 111 from a source address of the memory 101 or a source register of the register set 106 and transferred via a 32-bit branch bus 113 to a first input node of an arithmetic/logic operation unit (ALU) 109. On the other hand, destination data is read onto the sub-bus 112 from a destination register of the register set 106 and transferred via a 32-bit branch bus 32 to a second input node of the ALU 109. The destination data is further supplied to a blocking register 107. It should be noted that only the more significant 24 bits of the destination data are transferred via a 24-bit branch bus 116 to the blocking register 107 and stored therein. This is because the length of data to be processed is designated in the present embodiment by using the least significant bit (LSB) of one-word length data as a reference bit and the less significant 8 bits of the destination data are therefore always blocked. 32-bit operation result data derived from the ALU 109 is supplied to the first output buffer circuit 110 whose output node is connected via a 32-bit output bus 115 to the main-bus 111. The circuit 110 transfers full bits (32 bits) of the operation result data via the bus 115 onto the main-bus 111 in case of the one-word length operation being designated, the less significant 16 bits of the operation result data via the corresponding bit lines of the bus 115 onto the corresponding bit lines of the main-bus 111 in case of the half-word length operation being designated, and the less significant 8 bits of the operation result data via the corresponding bit lines of the bus 115 onto the corresponding bit lines of the main-bus 111 in case of the quarter-word length operation being designated. The more significant 24 bits of the destination data stored in the block register 107 are supplied to a second output buffer circuit 108 whose output node is connected to a 24-bit output bus 117 to the main-bus 111. The circuit 108 transfer no data onto the main-bus 111 in case of the one-word length operation being designated, the more significant 16 bits of the data from the register 107 via the corresponding bit lines of the bus 117 onto the more significant 16 bit lines of the main-bus 111 in case of the half-word length operation being designated, and full bits (24 bits) of the data from the register 107 via the bus 117 onto the more significant 24 bit lines of the main-bus 111 in case of quarter-word length operation being designated.

Figure 2:
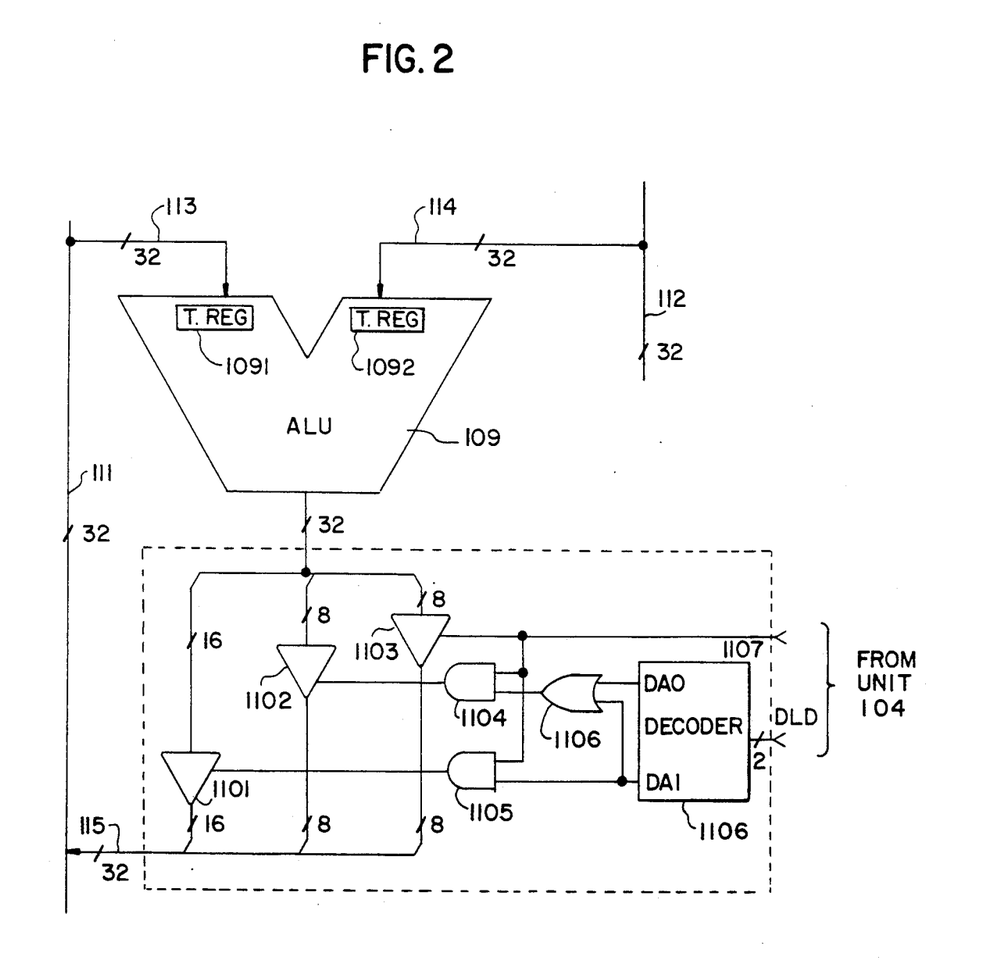
FIG. 2 is a circuit diagram representative of a first output buffer circuit shown in FIG. 1.

Turning to FIG. 2, the first output buffer circuit 110 includes three-state output buffers 1101 to 1103, two AND gates 1104 and 1105, one OR gate 106 and a decoder 1106. The output buffer 1101 receives the more significant 16 bits of the operation result data from the ALU 109 and transfers them onto the corresponding more significant 16 bit-lines of the bus 115 when the output of the AND gate 1105 takes a high level. The less significant 8 bits of the operation result data are transferred via the output buffer 1103 onto the corresponding less significant 8 bit-lines of the bus 115 when a output-enable signal 1107 of the high level is supplied from the control unit 104. The remaining 8 bits of the operation result data are transferred via the output buffer 1102 onto the corresponding bit-lines of the bus 115 when the AND gate 1104 produces the high level output. The output nodes of the buffers 1101 to 1103 are brought into a high impedance state when the outputs of the AND gate 1104 and 1105 and the signal 1107 takes the low level. The signal 1107 is further supplied to first input terminals of the AND gates 1104 and 1105 whose second input terminals are supplied with the output of the OR gate 1106 and a first output DA1 of the decoder 1106, respectively. The OR gate 1106 receives output DA0 and DA1 of the decoder 1106. The decoder 1106 receives data length designation data DLD consisting of 2 bits from the control unit 104. This data DLD takes logic level states shown in TABLE-1 in accordance with the designation of the data length. In response to the data DLD, the decoder 1106 controls the logic levels at the outputs DA0 and DA1 as also shown in TABLE-1.

TABLE-1

| Designated Data Length | DLD | DA0 | DA1 |
|---|---|---|---|
| Quarter-Word Length | 00 | 0 | 0 |
| Half-Word Length | 01 | 1 | 0 |
| One-Word Length | 10 | 0 | 1 |

When the data DLD are "00" to designate the quarter-word length, therefore, only the output buffer 1103 is activated by the output-enable signal 1107, so that only the less significant 8 bits of the operation result data are transferred onto the main-bus 111 via the output bus 115. When the data DLD are "01" to designate the half-word length, the output buffers 1103 and 1102 are activated in response to the output-enable signal 1107, whereas the buffer 1101 is held in the deactivated state, so that the less significant 16 bits of the operation result data are transferred onto the main-bus 111. When the one-word length is designated (DLD="10"), all the output buffers 1101 to 1103 are activated in response to the output-enable signal 1107, so that full bits (32 bits) of the operation result data are transferred onto the main-bus 111. Although not shown in FIG. 1, the ALU 109 includes first and second temporary registers 1091 and 1092 to temporarily store the source and destination data, respectively, as shown in FIG. 2.

Figure 3:
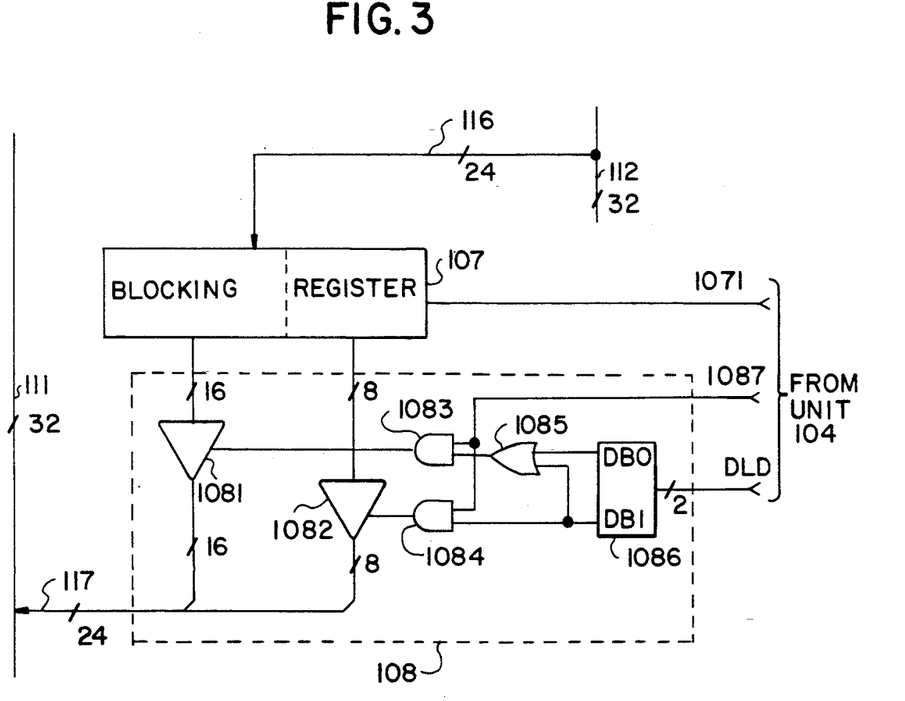
FIG. 3 is a circuit diagram representative of a second output buffer, circuit shown in FIG. 1.

Referring to FIG. 3, the second output buffer circuit 108 includes two output buffers 1081 and 1082, two AND gates 1083 and 1084, one OR gate 1085 and a decoder 1086, which are connected as shown. The decoder 1086 responds to the data length designation data DLD from the control unit 104 and controls the logic levels at its output DB0 and DB1, as shown in TABLE-2 below.

TABLE-2

| Designated Data Length | DLD | DB0 | DB1 |
|---|---|---|---|
| Quarter-Word Length | 00 | 0 | 1 |
| Half-Word Length | 01 | 1 | 0 |
| One-Word Length | 10 | 0 | 0 |

When one-word length is designated (DLD="10"), therefore, the output buffers 1081 and 1082 are held in the deactivated state to bring the outputs thereof into a high impedance. The data stored in the blocking register 107, i.e. the more significant 24 bits of the destination data, is thereby not transferred onto the main-bus 111. When DLD are "01" to designate the half-word length, only the buffer 1081 is activated by an output-enable signal 1087 supplied from the control unit 104, so that the more significant 16 bits of data from the register 107 are transferred onto the corresponding more significant 16 bit lines of the main-bus 111 via the output bus 117. When DLD are "00", i.e. when the quarter-word length is designated, both of the buffers 1081 and 1082 are activated in response to the signal 1087, so that all bits of the data from the register 107, i.e. the more significant 24 bits of the destination data, are transferred onto the corresponding more significant 24 bit lines of the main-bus 111. The blocking register 107 fetches the more significant 24 bits of the data on the sub-bus 112 in response to a write-enable signal 1071 supplied from the control unit 104.

The circuit operation will be described below with reference to FIGS. 1 to 3. Assume that the instruction decoder 103 decodes an instruction which designates a dyadic operation of quarter-word length on a register A (not shown) in the register set 106 as a source register and a register B (also not shown) in the register set 106 as a destination register. In response to the decoded output 1031 of this instruction, the execution control unit 104 produces, as the control information 1041, the data length designation data DLD of "00" which is in turn supplied to the decoders 1106 and 1086 and operation designation data such as an add-operation, a subtract-operation, a logic-operation, etc. which is in turn supplied to the ALU 109. The control unit 104 further produces various data read/write timing signals as the control information 1041. More specifically, two register selection signals are produced and supplied to the register set 106. The registers A and B in the register set 106 are thereby selected, and data of one-word length stored therein are read out onto the main-bus 111 and the sub-bus 112, respectively. Simultaneously with the register selection signals, the write-enable signal 1071 and two temporary register latch-enable signals are produced. As a result, the more significant 24 bits of the data read out of the register B are written into the blocking register 107, and the one-word length data read out of the registers A and B are stored into the temporary registers 1091 and 1092 of the ALU 109, respectively. The control unit 104 thereafter changes the register selection signals, write-enable signal 1071 and latch-enable signals to the inactive level to bring the buses 111 and 112 into a free state. On the other hand, the ALU 109 starts to perform the designated operation on the data derived from the registers A and B and produces the operation result data after performing the operation. When the ALU 109 completes the operation, the control unit 104 produces the output-enable signals 1107 and 1087 which are in turn supplied to the first and second output buffer circuits 110 and 108, respectively. The decoders 1086 and 1106 have been already supplied with the data DLD of "00". Accordingly, only the buffers 1103, 1081 and 1082 are activated in response to the output-enable signals 1107 and 1087. The remaining output buffers 1101 and 1102 are held in the deactivated state with the high impedance state of their output node. As a result, only the less significant 8 bits of the operation result data are transferred onto the less significant 8 bit lines of the main-bus 111 via the first output buffer circuit 110, and the more significant 24 bits of the destination data (i.e. the data of the register B) are transferred onto the more significant 24 bit lines of the main-bus 111 via the second output buffer circuit 108. Simultaneously with the output-enable signals 1107 and 1087, the control unit 104 produces the register selection signal only for selecting the register B. The data of one-word length on the main-bus 111 are thereby written into the register B in the register set 106. As a result, the less significant 8 bits of the register B are updated by the operation result and the remaining 24 bits thereof are held at previous data. Thus, the instruction designating the dyadic operation of quarter-word length is executed.

When another instruction of a monadic operation is decoded, the control unit produces one register selection signal to read out data stored therein onto the sub-bus 112, and simultaneously produces the write-enable signal 1071 and the second latch-enable signal for the temporary register 1092. The subsequent sequence control is the same as the dyadic operation.

Figure 4:
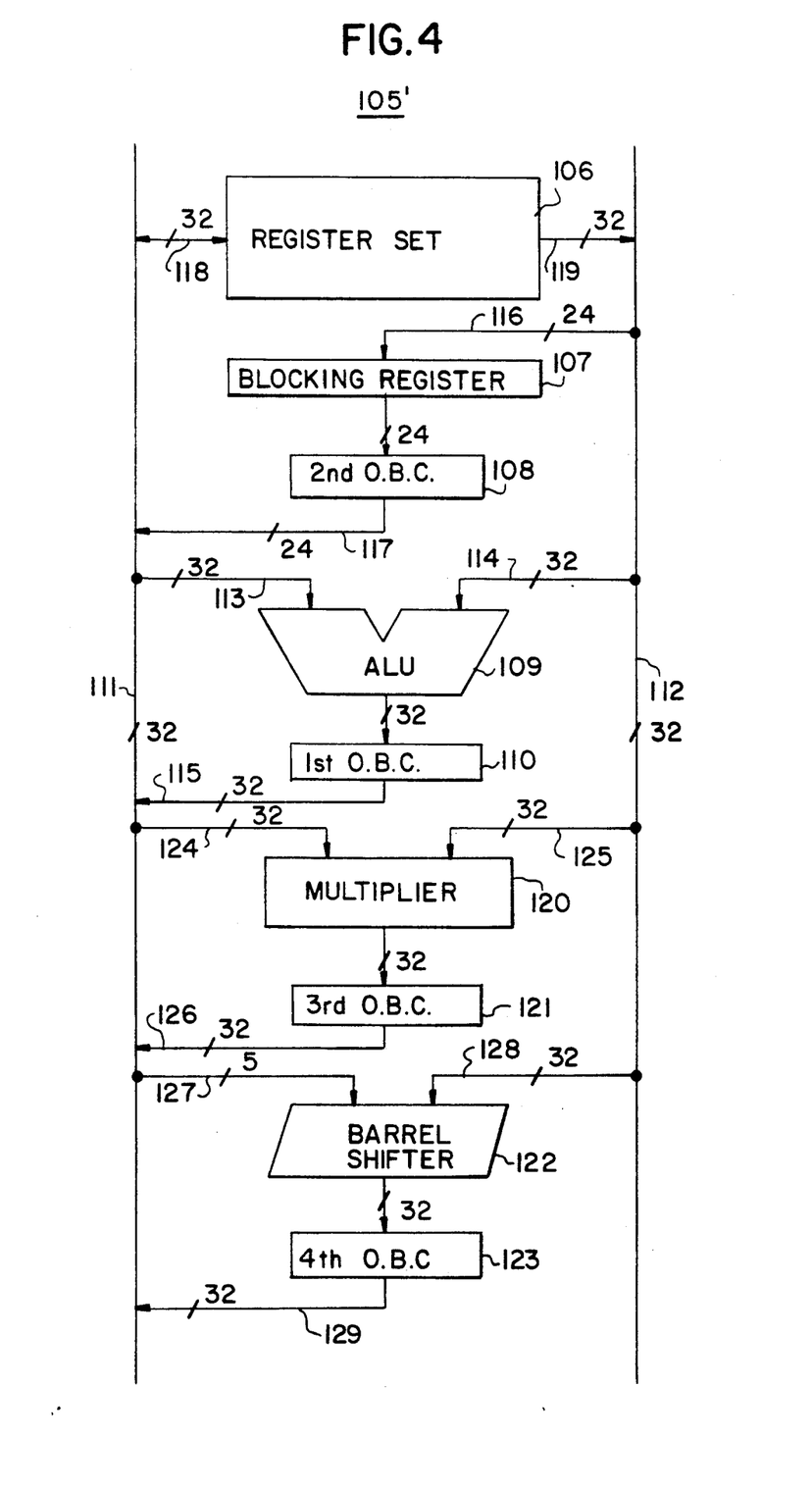
FIG. 4 is a block diagram representative of another embodiment of the present invention.

Turning to FIG. 4, there is shown only an execution unit 105' of a data processor according to another embodiment of the present invention, in which the same constituents as those shown in FIG. 1 are denoted by the same reference numerals to avoid further description thereof. The execution unit 105' further includes a multiplier 120 and a barrel shifter 122 and additional operation units. The multiplier 120 performs a multiplying operation on source data supplied via a 32-bit branch bus 124 and destination data supplied via a 32-bit branch bus 125. The multiplied resulting data of one-word length is supplied to a third output buffer circuit 121 which has the same circuit construction as that shown in FIG. 2. However, an output-enable signal to be supplied to the circuit 121 is produced by the control unit 104 only when an instruction designating a multiplying operation is decoded. The circuit 121 is coupled to the main-bus 111 via a 32-bit output bus 126. The barrel shifter performs a shifting operation on data supplied via a 32-bit branch bus 128 by a shift value designated by shift data supplied from a 5-bit branch bus 127. The shifted resulting data of one-word length is supplied to a fourth output buffer circuit 123 which also has the same circuit construction as that shown in FIG. 2. However, an output-enable signal to be supplied to the circuit 123 is produced only when there is an instruction designating a data shift operation. The output of the circuit 123 is transferred onto the main-bus 111 via a 32-bit output bus 129. Since only one of the ALU 109, multiplier 120 and barrel shifter 122 operates in accordance with an instruction to be executed, the block register 107 can be used in common for the arithmetic/logic operation, multiplying operation and data shifting operation.

Figure 5:
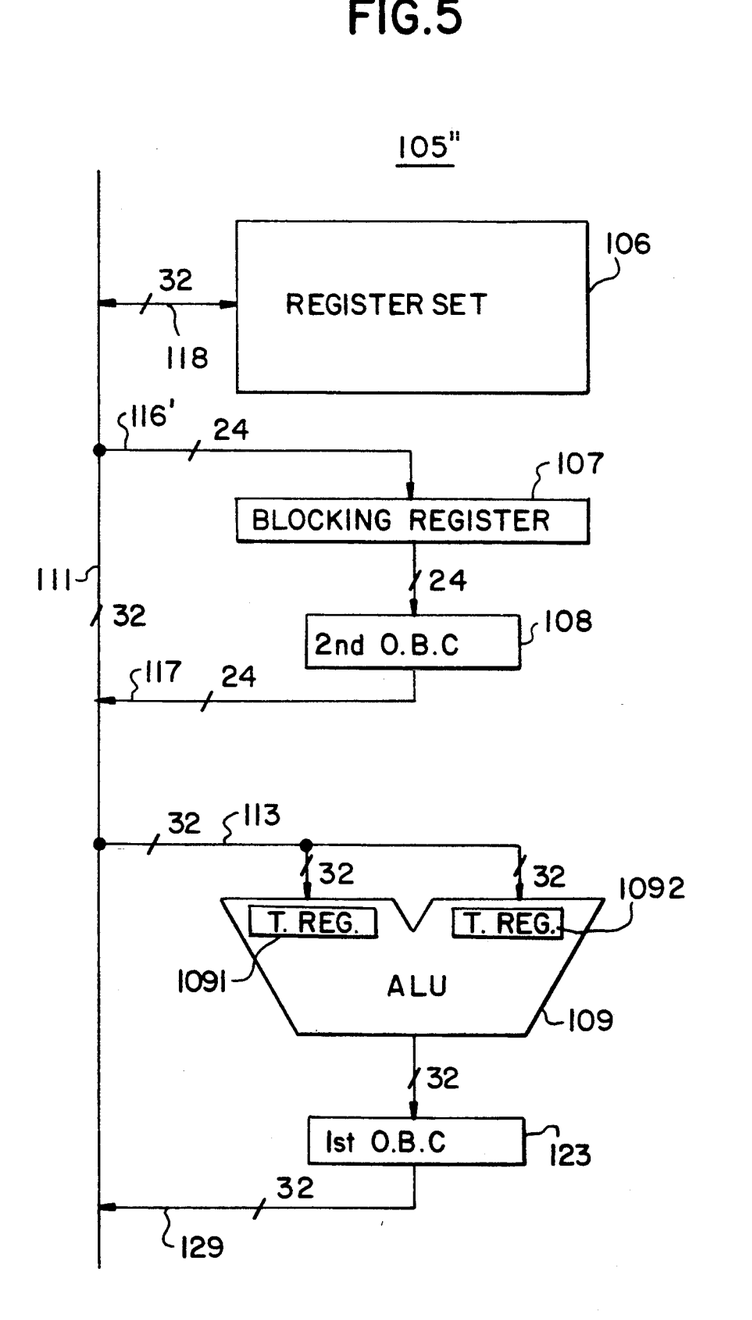
FIG. 5 is a block diagram representative of still another embodiment of the present invention.

In the above embodiments, two 32-bit data buses 111 and 112 are provided to supply simultaneously the source and destination data to the operation unit 109, 121, or 123, so that the operation speed is further enhanced. The source and destination data may, be however, supplied to the operation unit in time sharing. The circuit construction to this end is shown in FIG. 5 as still another embodiment of the present invention. In the unit 105" shown in FIG. 5, the same constituents as those shown in FIG. 1 are denoted by the same reference numerals to avoid further description thereof.

When the control unit 104 (FIG. 1) receives the decoded output 1031 of an instruction which designates a dyadic operation on data of two source registers, it produces first a source register selection signal. The data of one-word length stored in the source register in the register set 106 is thereby read out onto the main-bus 111 via the bus 118. Simultaneously with the source register selection signal, the control unit 104 produces a first temporary register latch-enable signal, so that the first temporary register 1091 stores the data of the source register. The control unit 104 thereafter produces a destination register selection signal, the write-enable signal 1071 (FIG. 3) and a second temporary register latch-enable signal simultaneously. Accordingly, the data of one-word length stored in a destination register in the register set 106 is read out onto the main-bus 111 and is temporarily stored in the second temporary register 1092 via the bus 113. Moreover, the more significant 24 bits of the destination data are written into the blocking register 107 via a bus 116'. The control unit 104 further supplies the data length designation data DLD to the decoders 1106 and 1086 (FIGS. 2 and 3) and the operation designating data to the ALU 109. After the ALU 109 performs the designated operation on the source and destination data, the control unit 104 produces the output-enable signals 1107 and 1087 (FIGS. 2 and 3) and the designation register selection signal simultaneously. In accordance with the designated data length, therefore, the first output circuit 123 transfers onto the bus 111 full or partial bits of the operation result data and no, full or partial bits of the data from the blocking register 107, and the data on the bus 111 is then written into the destination register in the register set 106.

The present invention not limited to the above embodiments, but may be changed and modified without departing from the scope and spirit of the invention. For example, the present invention is applicable to a data processor in which one word consists of 8-bits, 16-bits or 64-bits. Moreover, the number of data lengths which can be designated is not limited to three.

What is claimed is:

1. A data processor for processing operand data and updating one portion of a destination area with processed data while maintaining data stored in a remaining portion of said destination area, said data processor comprising:
   an operation unit for processing data supplied thereto,
   storage means for temporarily storing data supplied thereto,
   register means having said destination area, means for supplying said operand data to said operation unit,
   means coupled to said register means for supplying said storage means with data of said destination area including said data stored in said remaining portion of said destination area simultaneously with said operand data being supplied to said operation unit, said operation unit producing said processed data in response to said operand data,
   a data bus,
   first transfer means coupled between said operation unit and said data but for transferring onto one portion of said data bus one portion of said processed data corresponding to said one portion of said destination area,
   second transfer means coupled between said storage means and said data bus for transferring onto a remaining portion of said data bus data stored in said storage means corresponding to said remaining portion of said destination area simultaneously with said first transfer means transferring said one portion of said processed data, and
   means for writing data on said data bus into said destination area.

2. The processor as claimed in claim 1, wherein said operand data is data stored in said destination area.

3. The processor as claimed in claim 1, further comprising means for supplying additional operand data to said operation unit, said operation unit performing a dyadic operation on two operand data.

4. A data processor comprising:
   a data bus,
   register means having a destination area,
   first means for reading data from said destination area onto said data bus,
   a blocking register coupled to said data bus for temporarily storing said data read from said destination area,
   an operation unit coupled to said data bus for performing an operation on said data read from said destination area and for producing operation result data,
   control means for generating information designating a data length to be processed,
   second means coupled to said operation unit and said control means and responsive to said information for outputting from the operation unit to the data bus a portion of said operation result data corresponding in length to said data length designated by said information,
   third means coupled to said blocking register and said control means and responsive to said information for outputting to said data bus said data stored in said blocking register except for a portion thereof determined by said data length designated by said information simultaneously with said second means outputting said portion of said operation result data to said data bus,
   whereby combined data is outputting from said second and third means to said data bus, and
   fourth means for writing said combined data into said destination area.

5. A data processor comprising:
   a data bus,
   register means having a destination area,
   first means for reading data from said destination area onto said data bus,
   a blocking register coupled to said data bus for temporarily storing said data read from said destination area,
   an operation unit coupled to said data bus for performing an operation on said data read from said destination area and for producing operation result data,
   control means for generating information designating a data length to be processed,
   second means coupled to said operation unit and said control means and responsive to said information for outputting from the operation unit to the data bus a portion of said operation result data corresponding in length to said data length,
   third means coupled to said blocking register and said control means and responsive to said information for outputting to said data bus data stored in said blocking register except for a portion thereof determined by said data length, whereby data is outputting from said second and third means to produce combined data to said data bus, and fourth means for writing said combined data into said destination area.

6. A processor comprising:

first and second data buses, a register set coupled between said first and second data buses, first means coupled to said register set for designating one register of said register set as a destination register and for reading data stored in said destination register onto said first data bus as destination data, a blocking register coupled to said first data bus for temporarily storing at least one part of said destination area, second means coupled to said second data bus for transferring source data onto said second data bus, an operation unit coupled to said first and second data buses and performing an operation on source data and destination data to produce operation result data, control means for generating information representative of a data length to be processed, third means coupled to said operation unit, said control means and said second data bus and responsive to said information for transferring onto said second data bus a portion of said operation result data corresponding in length to said data length, fourth means coupled to said blocking register, said control means and said second data bus and responsive to said information for transferring onto said second data bus said data stored in said blocking register except for a portion determined by said data length simultaneously with said third means transferring said portion of said operation result data, and fifth means for writing into said destination register data transferred onto said second data bus by said third and fourth means.

7. The processor as claimed in claim 6, wherein said second means includes means for designating another register of said register set as a source register and transferring data stored in said source register onto said second bus as said source data.

8. A method for reading data out of a destination area nd writing data into said destination area, including the steps of:

reading data from said destination area onto a data bus;

temporarily storing data from said data bus to provide stored data;

performing an operation upon data from said data bus to produce operation result data;

outputting, in response to information designating a data length, a portion of said operation result data corresponding to said data length;

outputting, in response to said information designating said data length, a portion of said stored data except for a remaining portion thereof, said remaining portion determined by said data length and corresponding to the least significant, consecutive bits of said stored data;

combining said portion of said operation result data and said portion of said stored data to provide combined data; and writing said combined data into said destination area.

9. A method for processing data, including the steps of:

providing one register as a destination register for storing destination data;

outputting said destinating data from said destination register onto a first bus as first data;

temporarily storing said first data from said first bus into a blocking register to provide stored data;

transferring source data onto a second bus as second data;

performing an operation on said first data and on said second data and producing operation result data;

transferring, in response to information representative of a data length to be processed, onto said second bus a portion of said operation result data corresponding to said data length;

transferring, in response to said information, onto said second bus said stored data except for a remaining portion, said remaining portion determined by said data length and corresponding to the least significant consecutive bits of said stored data; and writing into said destination register from said second bus all data transferred in response to said information.

10. A method as claimed in claim 9, wherein said source data is from a source register.

* * * * *